T. E. MURRAY, Jr., AND J. B. MURRAY.
METHOD OF MAKING HOUSINGS FOR AUTOMOBILE TRANSMISSION GEAR.
APPLICATION FILED OCT. 8, 1919.

1,350,830.

Patented Aug. 24, 1920.

Inventors
Thomas E. Murray Jr.
Joseph B. Murray
By their Attorney

UNITED STATES PATENT OFFICE.

THOMAS E. MURRAY, JR., AND JOSEPH B. MURRAY, OF BROOKLYN, NEW YORK.

METHOD OF MAKING HOUSINGS FOR AUTOMOBILE TRANSMISSION-GEAR.

1,350,830.   Specification of Letters Patent.   Patented Aug. 24, 1920.

Application filed October 8, 1919. Serial No. 329,353.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Making Housings for Automobile Transmission-Gear, of which the following is a specification.

The invention is a method of making a metal housing for transmission gear, the said housing consisting of two straight tubular end portions and a middle portion of greater diameter than said end portions, and consists in the steps more particularly set forth in the claims.

In the accompanying drawing—

Figure 1:
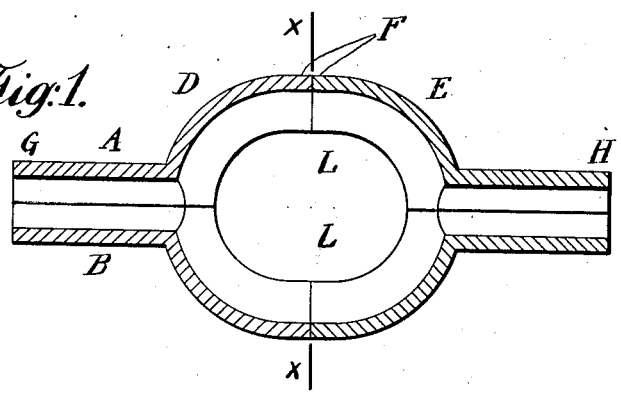
Figure 2:
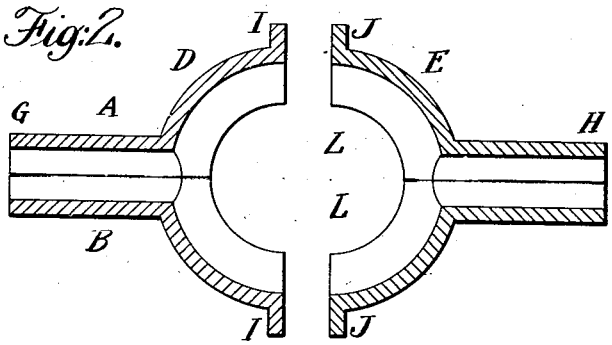
Figure 3:
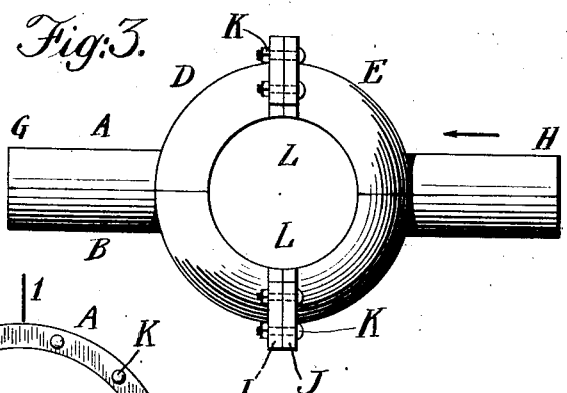
Figure 4:
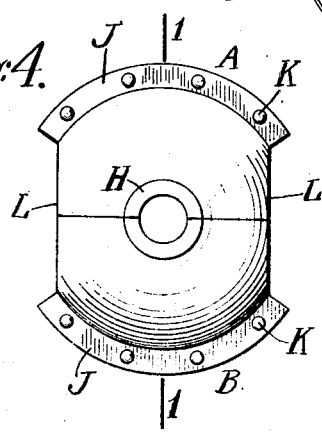

Figure 1 is a longitudinal section on the line 1, 1 of Fig. 4, showing the two half sections of our housing in position for welding. Fig. 2 is a similar section, showing the welded half sections cut transversely apart on the line $x$, $x$ of Fig. 1, and having the ends of the enlarged portions flanged. Fig. 3 is an elevation of the completed housing, showing the flanges united by bolts and nuts. Fig. 4 is an end view of the completed housing.

Similar letters of reference indicate like parts.

In making our housing, we first produce by stamping or pressing, two similar and interchangeable longitudinal half sections A, B of sheet metal, each section comprising a middle enlarged concavo-convex portion which comprises two hemispherical portions D, E, with an intervening portion F, these several portions being integral. Adjacent to and integral with the hemispherical portions D, E are straight semi-tubular portions G, H. The two longitudinal half sections A, B are placed with their edges in registry and electrically welded together. We then divide the welded objects into two similar parts transversely on the plane of the line $x$, $x$, so that half of the portion F lies in each division. By any suitable means, we then turn the half portions of F outwardly to form flanges I, J, and after placing said flanges in registry we unite them preferably by bolts and nuts K. The object of dividing the parts is to permit of the introduction of the mechanism to be inclosed in the housing, which is done before the said parts are united by the bolts and nuts. In the walls of the middle enlarged portion are semicircular recesses L which register when the parts are assembled, and permit of the connection of the power transmitting mechanism to the inclosed mechanism in the usual way. The flanges may be united by rivets, or in any other desired way; but we prefer the detachable union effected by the bolts and nuts, so that, if desired, by releasing the same, more convenient access can be had to the inclosed mechanism in case of injury or needed replacement of the same or of parts thereof.

We claim:

1. The method of making a housing of the type set forth, which consists in first forming of sheet metal two interchangeable longitudinal half sections of said housing of substantially the shape set forth; second, placing the edges of said sections in registry and electrically welding them together; third, transversely dividing said welded object at the middle of the enlarged portion thereof; fourth, bending outwardly the edges of said divided parts to form flanges, and fifth, placing said flanges in registry and uniting the same.

2. The method of making a housing, as set forth in claim 1, the fifth step thereof further including the uniting of said flanges detachably from one another.

In testimony whereof we have affixed our signatures in presence of two witnesses.

THOMAS E. MURRAY, JR.
JOSEPH B. MURRAY.

Witnesses:
GERTRUDE T. PORTER,
MAY T. McGARRY.